US012345226B2

(12) United States Patent
Sarder et al.

(10) Patent No.: US 12,345,226 B2
(45) Date of Patent: Jul. 1, 2025

(54) ELECTRONIC IGNITION SYSTEM FOR A GENERATOR ENGINE

(71) Applicant: Champion Power Equipment, Inc., Santa Fe Springs, CA (US)

(72) Inventors: Mark J. Sarder, Waukesha, WI (US); Russell J. Dopke, Elkhart Lake, WI (US); Hiroaki Sato, Brookfield, WI (US); Leigh A. Jenison, Hartland, WI (US); Mark A. Kastner, New Berlin, WI (US)

(73) Assignee: Champion Power Equipment, Inc., Las Vegas, NV (US)

( * ) Notice: Subject to any disclaimer, the term of this patent is extended or adjusted under 35 U.S.C. 154(b) by 1246 days.

(21) Appl. No.: 16/389,094

(22) Filed: Apr. 19, 2019

(65) Prior Publication Data

US 2020/0332758 A1 Oct. 22, 2020

(51) Int. Cl.
*F02B 63/04* (2006.01)
*F01P 1/00* (2006.01)
(Continued)

(52) U.S. Cl.
CPC ............... *F02P 5/1502* (2013.01); *F01P 1/00* (2013.01); *F02B 75/22* (2013.01); *F02D 41/30* (2013.01);
(Continued)

(58) Field of Classification Search
CPC .......... F02P 5/1502; F02P 5/1504; F02P 5/15; F02P 5/00; F02P 5/02; F02P 5/04;
(Continued)

(56) References Cited

U.S. PATENT DOCUMENTS 2,165,969 A 7/1939 Humbert et al.
3,219,219 A * 11/1965 Singer ................ B66F 9/07572 414/635
(Continued)

FOREIGN PATENT DOCUMENTS

CN 1800600 A 7/2006
CN 2890369 Y 4/2007
(Continued)

OTHER PUBLICATIONS

Nykomb Synergetics, "Chemicals and Fuels", DME Section, http//www.nykomb.se/index.php?s=Chemicals, Jun. 3, 2008, (Year: 2008).

*Primary Examiner* — Gonzalo Laguarda
(74) *Attorney, Agent, or Firm* — Ziolkowski Patent Solutions Group, SC

(57) ABSTRACT

A standby generator includes an alternator to produce electricity for distribution to an electrical system, and an air-cooled internal combustion engine driving the alternator. The air-cooled internal combustion engine includes one or more cylinders, one or more spark plugs each configured to initiate combustion in a corresponding cylinder, and one or more ignition coils each coupled to a respective spark plug of the one or more spark plugs to provide a voltage to the respective spark plug. The standby generator also includes a battery system electrically coupled to the one or more ignition coils to provide power thereto, and a digital ignition module wiring the battery system to each of the one or more ignition coils to control operation of the one or more spark plugs.

31 Claims, 7 Drawing Sheets

(51) Int. Cl.

| | |
|---|---|
| ***F02B 75/22*** | (2006.01) |
| ***F02D 41/30*** | (2006.01) |
| ***F02D 43/04*** | (2006.01) |
| ***F02P 5/15*** | (2006.01) |
| ***F02P 7/067*** | (2006.01) |
| ***F02P 11/02*** | (2006.01) |
| ***F02P 15/00*** | (2006.01) |

(52) U.S. Cl.
CPC .............. *F02D 43/04* (2013.01); *F02P 7/067* (2013.01); *F02P 11/02* (2013.01); *F02P 15/006* (2013.01)

(58) Field of Classification Search
CPC ........ F02P 5/06; F02P 5/10; F02P 5/14; F02P 5/142; F02P 5/145; F02B 75/22; F02D 41/22; F02M 57/06
See application file for complete search history.

(56) References Cited

U.S. PATENT DOCUMENTS 3,459,165 A 8/1969 Bender et al.
3,757,756 A 9/1973 Owyoung et al.
3,785,356 A * 1/1974 Niemoeller ........... F02P 5/1556 123/406.19
3,851,469 A * 12/1974 Eichler ................. F01N 3/2053 60/277
3,861,372 A * 1/1975 Shibukawa ............. F02P 1/086 123/406.57
3,923,021 A * 12/1975 Stark ......................... G06F 7/62 123/406.55
3,935,845 A * 2/1976 Aono ...................... F02P 5/155 123/406.52
3,971,350 A * 7/1976 Hays ......................... F02P 5/02 123/406.58
4,033,272 A * 7/1977 Henrich ................ F02P 5/1556 123/406.53
4,047,507 A * 9/1977 Noguchi ............... F02D 31/001 123/344
4,063,539 A * 12/1977 Gorille .................. F02P 7/0775 123/406.52
4,085,715 A * 4/1978 Otaka ..................... F02P 5/103 123/406.69
4,116,174 A * 9/1978 Schlichting ............. F02P 5/155 123/406.66
4,145,608 A * 3/1979 Shirasaki ................ F02P 7/073 250/231.14
4,150,652 A * 4/1979 Nagasawa ............. F02P 5/1555 123/406.57
4,158,350 A * 6/1979 Moller .................. F02P 5/1555 123/406.19
4,236,491 A * 12/1980 Hattori .................... F02P 5/152 123/406.37
4,331,880 A 5/1982 Dittman et al.
4,496,286 A * 1/1985 Gagnon ................ F02P 5/1516 417/22
4,608,946 A 9/1986 Tanaka et al.
4,684,814 A 8/1987 Radomski
4,702,201 A 10/1987 Odo et al.
4,747,061 A 5/1988 Lagree et al.
5,175,439 A 12/1992 Harer et al.
5,198,698 A 3/1993 Paul et al.
5,705,859 A 1/1998 Karg et al.
5,868,115 A 2/1999 Fukui
5,899,174 A 5/1999 Anderson et al.
5,903,065 A 5/1999 Dragos
5,992,380 A * 11/1999 Inagaki ................... F02P 7/067 123/339.11
6,028,369 A 2/2000 Hirose et al.
6,331,740 B1 12/2001 Morohoshi et al.
6,357,427 B1 * 3/2002 Luttrelll ................ F02P 3/0456 123/609
6,376,944 B1 4/2002 Grizzle, Jr. et al.
6,489,690 B1 12/2002 Hatsugai et al.
6,705,253 B2 * 3/2004 Lesniak .................. F02B 75/22 123/25 A
6,784,574 B2 8/2004 Turner et al.
6,825,573 B2 11/2004 Suzuki et al.
6,975,042 B2 12/2005 Yamada et al.
7,134,407 B1 * 11/2006 Nelson .................... F02B 73/00 123/54.4
7,537,070 B2 5/2009 Maslov et al.
7,642,665 B2 1/2010 Konop et al.
7,886,706 B2 2/2011 Grybush
7,986,053 B2 7/2011 Bass
8,060,293 B2 * 11/2011 Meyer ................... F02D 41/045 701/104
8,387,599 B2 * 3/2013 McAlister ............. F02D 35/025 123/675
8,589,002 B1 * 11/2013 Henry ..................... F02D 41/40 701/19
8,899,191 B2 12/2014 Yano et al.
9,617,951 B2 4/2017 Sotiriades et al.
11,084,412 B1 * 8/2021 Shultz ........................ H02J 7/35
11,143,099 B2 * 10/2021 Sarder ................... F02B 63/044
11,177,720 B2 * 11/2021 Sarder ........................ H02P 9/48
2002/0000342 A1 1/2002 Yamada et al.
2008/0202474 A1 * 8/2008 Matsuda ................. F02B 75/22 123/478
2009/0091190 A1 4/2009 Gottfried
2009/0101630 A1 * 4/2009 Trinkner .............. B23K 9/1081 219/133
2009/0230683 A1 9/2009 Bass
2010/0318279 A1 * 12/2010 Meyer ................... F02D 41/045 701/103
2011/0031046 A1 2/2011 Zolman et al.
2011/0048374 A1 * 3/2011 McAlister .............. F02M 57/06 123/436
2011/0073064 A1 3/2011 Mavinahally et al.
2011/0187194 A1 8/2011 Keimling et al.
2011/0248511 A1 10/2011 Marlenee et al.
2013/0187392 A1 7/2013 Janscha et al.
2014/0167503 A1 6/2014 Redpath et al.
2015/0115745 A1 4/2015 Wang et al.
2015/0247482 A1 * 9/2015 Enomoto ............ F02N 11/0844 701/113
2016/0233739 A1 8/2016 Jenison et al.
2016/0294255 A1 10/2016 Schmit et al.
2016/0319728 A1 11/2016 Jenison et al.
2017/0077683 A1 3/2017 Marrs
2017/0126057 A1 5/2017 Jenison et al.
2018/0175629 A1 * 6/2018 Andrei .................... B60P 3/005
2019/0113383 A1 4/2019 Sanhaji
2019/0353081 A1 * 11/2019 Sarder ................... F02B 63/044
2019/0390580 A1 * 12/2019 Sarder ...................... F28D 1/024
2020/0234252 A1 7/2020 Johnson et al.
2021/0215109 A1 * 7/2021 Martin .................. F02B 63/042
2022/0003157 A1 * 1/2022 Sarder ..................... F02N 11/00

FOREIGN PATENT DOCUMENTS

CN 204024810 U 12/2014
CN 104314676 A 1/2015

* cited by examiner

ELECTRONIC IGNITION SYSTEM FOR A GENERATOR ENGINE

BACKGROUND OF THE INVENTION

Embodiments of the invention relate generally to standby generators and, more particularly, to an electronic ignition system for use with an air-cooled engine in a standby generator.

Engine-driven, electrical generators are used in a wide variety of applications. Typically, an electrical generator utilizes a single driving engine directly coupled to a generator or alternator through a common shaft. Upon activation of the generator, a fuel and air mixture is provided to the combustion chambers of corresponding cylinders of the engine. The fuel mixture in each combustion chamber is ignited, thereby causing an explosion within the cylinders. The explosive forces within the combustion chambers in the cylinders cause linear motion of the pistons within their corresponding cylinders. This linear motion of the pistons is then converted into rotational motion by a crankshaft that, in turn, drives the alternator. As is conventional, the driven alternator generates electrical power. For instance, a standby generator can produce power for delivery to an electrical system of a building via an automatic transfer switch when an outage occurs in the electrical grid.

Typically, standby generators having a spark ignition engine use a magneto to power one or more spark plugs of the engine. Magneto systems usually provide a voltage to each spark plug proportional to engine speed. Since magnetos generate power based on engine speed, inconsistent sparking can occur at different engine speeds causing unpredictable combustion in each cylinder. When the engine turns at low speed, for example while cranking during startup, sufficient voltage may not be provided by the magneto to each spark plug required to initiate combustion. Startup can be particularly troublesome for generators located in extremely cold climates, since low temperatures can decrease battery voltage supplied to a starter motor resulting in lower cranking speed. Not only does reduced starting power limit cranking speeds, but cold temperatures can increase viscosity of engine oil causing internal friction that further limits turnover rates during startup. Decreased cranking speeds reduce power generated by the magneto, leading to poor sparking at each spark plug and thereby adding further difficulty to startup.

Magneto ignitions typically fire with a constant ignition timing. In an inductor magneto, for example, magnets can be coupled to a flywheel or other rotating components of the engine. The crankshaft rotates the flywheel causing the magnets to rotate past a low tension winding of the magneto. The magneto can be connected to an external ignition coil which has a low tension or primary winding and a secondary winding that delivers a high voltage required for each respective spark plug. The magneto typically fires the spark plug one or more times per revolution of the crankshaft when a magnet rotates past the magneto winding. Thus, a magneto system typically fires each spark plug at identical rotational angles of the crankshaft. The ignition timing of a magneto system can generally be predetermined and not readily changed to account for changing operating conditions.

Therefore, it would be desirable to provide an engine driven, electrical generator that provides consistent voltage to ignition coils of the engine for sparking each respective spark plug. It would be further desirable to have a programmable ignition system to optimize engine performance by controlling ignition timing based on changing operating conditions of the generator.

BRIEF DESCRIPTION OF THE INVENTION

Embodiments of the invention are directed to a standby generator having an electronic ignition system for an internal combustion engine that drives an alternator.

In accordance with one aspect of the invention, a standby generator includes an alternator to produce electricity for distribution to an electrical system, and an air-cooled internal combustion engine driving the alternator. The air-cooled internal combustion engine includes one or more cylinders, one or more spark plugs each configured to initiate combustion in a corresponding cylinder, and one or more ignition coils each coupled to a respective spark plug of the one or more spark plugs to provide a voltage to the respective spark plug. The standby generator also includes a battery system electrically coupled to the one or more ignition coils to provide power thereto, and a digital ignition module wiring the battery system to each of the one or more ignition coils to control operation of the one or more spark plugs.

In accordance with another aspect of the invention, a generator includes an internal combustion engine having a crankcase and one or more cylinders extending from the crankcase. Each cylinder includes an intake valve and an exhaust valve to actuate between open and closed positions regulating fuel flow through the cylinder, a spark plug configured to initiate combustion of the fuel in the cylinder, and a piston operatively positioned in the cylinder. The internal combustion engine also includes a crankshaft in the crankcase and driven by each piston of the one or more cylinders, and a camshaft in the crankcase driven by the crankshaft and coupled to actuate each intake valve and each exhaust valve of the one or more cylinders according to a rotational position of the crankshaft. The generator also includes an inductive pickup mounted to the crankcase adjacent the camshaft configured to sense a rotational position of the camshaft, and a battery-operated ignition system wired to power each spark plug of the one or more cylinders. The battery-operated ignition system may be wired to the inductive pickup to receive a signal on a sensed rotational position of the camshaft and programmed to operate each spark plug based on the signal received from the inductive pickup. An alternator preferably mounts operatively to the crankshaft to produce electricity for distribution from the generator.

In accordance with yet another aspect of the invention, a generator includes a spark-ignition engine operable on a source of combustible fuel. The spark-ignition engine includes a crankcase, one or more cylinders operatively coupled to the crankcase, one or more spark plugs each mounted to a respective cylinder to initiate combustion of the fuel in the respective cylinder, and one or more ignition coils each coupled to a respective spark plug to provide a voltage to the respective spark plug. The generator may also include a battery system electrically coupled to each ignition coil to provide power thereto, and one or more sensors mounted on or within the generator to obtain data on an operating characteristic of the generator. A digital ignition module may be wired to each ignition coil to control operation of each respective spark plug, the digital ignition module programmed to receive data on an operating characteristic of the generator from each of the one or more sensors and to interrupt spark ignition of the combustible fuel upon determining the received data indicates a predetermined characteristic of the generator. An alternator may be driven by the spark-ignition engine to produce electrical power.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

An operating environment of the invention is described here below with respect to a standby generator having an internal combustion engine driving an alternator for power generation in a horizontal crankshaft arrangement. However, it will be appreciated by those skilled in the art that the invention is equally applicable for use with other generator arrangements including portable or other electrical generators. While the invention will be described with respect to a standby generator having a multi-chamber generator enclosure, embodiments of the invention are equally applicable for use with single-chamber or other types of generator enclosures.

Figure 1:
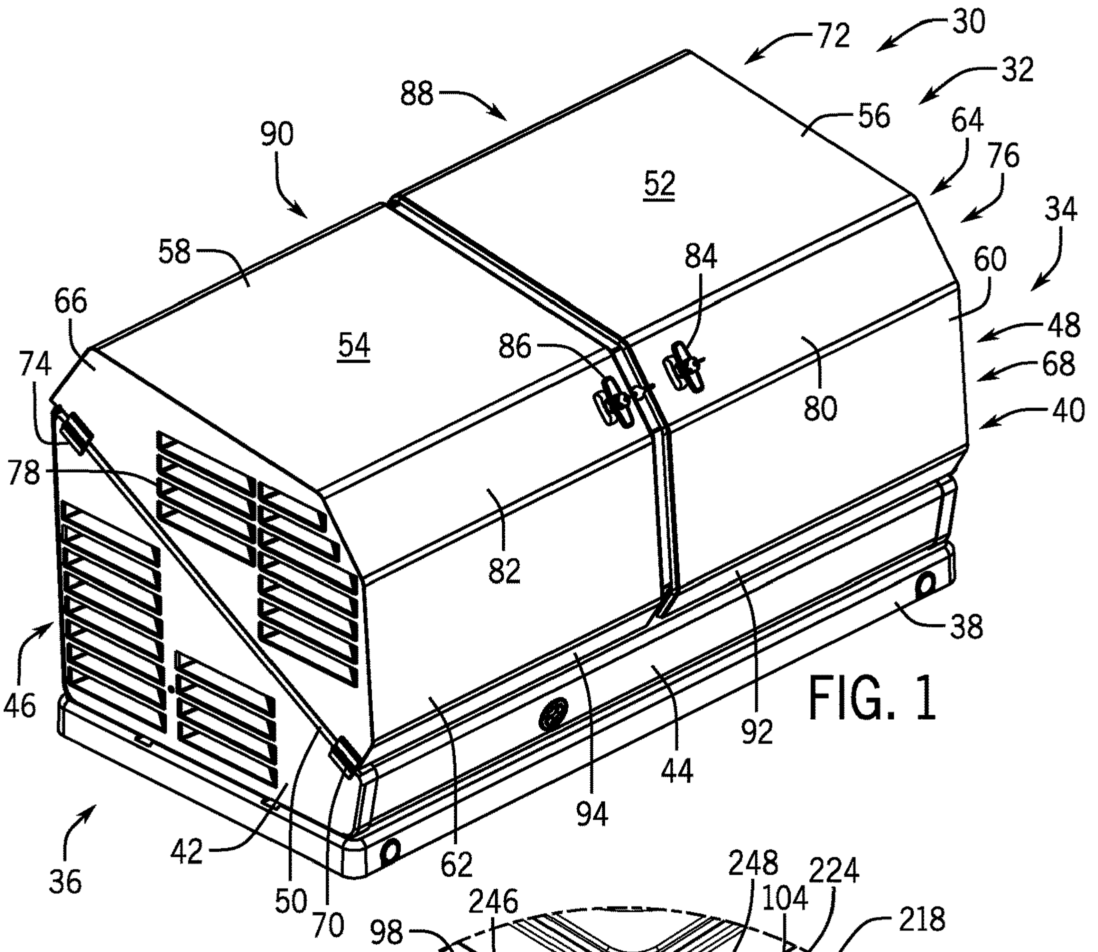
FIG. 1 is perspective view from the left upper side of an electrical generator, according to an embodiment of the invention.

Referring to FIG. 1, a standby generator 30 is shown, in accordance with an embodiment of the invention. The standby generator 30 produces electrical energy and may deliver the electrical energy to a distribution panel of a home, office, shop, business or any other building requiring electricity. The standby generator 30 may include an internal combustion engine, an alternator driven by the internal combustion engine, and other associated components. The internal combustion engine operates on a fuel source that may include gasoline, liquefied petroleum gas (LPG), propane, butane, natural gas, or any other fuel source suitable for operating the engine. For instance, the internal combustion engine may comprise a single fuel engine configured to operate on one of the fuels. Alternatively, the engine may comprise a dual fuel or multi-fuel engine configured to switch operation between two or more of the fuel sources. In one embodiment, the engine may comprise a dual fuel engine configured to switch operation between LPG and gasoline, or LPG and natural gas. The alternator and engine may form an engine-generator set used to produce electricity for distribution from the standby generator 30.

The standby generator 30 may include a standby generator enclosure 32 to house the engine-generator set and other associated components. In the embodiment of FIG. 1, the engine-generator set is positioned in a horizontal crankshaft arrangement with the alternator located toward a first end 34 of the enclosure 32 and the engine located toward a second end 36 of the enclosure 32. The standby generator enclosure 32 may include a base 38 to support the engine-generator set. The enclosure 32 may also have a first sidewall 40 and a second sidewall 42 each extending generally vertically from opposite ends of the base 38 at the first end 34 and the second end 36 of the enclosure 32, respectively. The enclosure 32 may also include a front wall 44 and a back wall 46 extending generally vertically from the base 38 between the first sidewall 40 and the second sidewall 42, with the front wall 44 and the back wall 46 defining a front and a back sidewall of the standby generator 30. The front wall 44 and the back wall 46 may be angled slightly from vertical such that each has a bottom portion positioned slightly inward from a corresponding top portion. The first sidewall 40 and the second sidewall 42 may each have a respective top edge 48, 50 that generally slopes diagonally from a taller back wall 46 to a shorter front wall 44.

The enclosure 32 may also include one or more hoods to cover the standby generator 30. The embodiment shown in FIG. 1 has a first hood 52 and a second hood 54, also referred to as doors, coupled to a respective first sidewall 40 and second sidewall 42. The first hood 52 and the second hood 54 may each have a top panel 56, 58, a front panel 60, 62, and a side panel 64, 66 with the side panels generally perpendicular to the respective top and front panels. The side panels 64, 66 of each hood 52, 54 may each be a coupled to a respective one of the first sidewall 40 and the second sidewall 42 of the enclosure 32 using a first hinge 68, 70 and a second hinge 72, 74. The side panels 64, 66 may include vents 76, 78 with louvers, and vents may be formed in the first sidewall 40 and the second sidewall 42. The top panels 56, 58 are preferably sloped downward toward the front of the enclosure 32 and the front panels 60, 62 may slope forward toward the base 38 of the enclosure 32 to enhance water runoff.

Each hood 52, 54 may also have a front transition panel 80, 82 between the respective top panel 56, 58 and the front panel 60, 62. The front transition panels 80, 82 further encourage water runoff and add to an aesthetically pleasing design. A handle 84, 86 may be attached to the front transition panel 80, 82 of each hood 52, 54 for opening the hoods and exposing internal components of the standby generator 30. The front transition panels 80, 82 are designed so the handles 84, 86 enhance accessibility by directionally facing a person standing in front of the enclosure 32 when the hoods 52, 54 are closed. Each hood 52, 54 may also have a rear transition panel 88, 90 that slopes downward from the respective top panel 56, 58 toward the back wall 46 when the hoods are closed. Each hood 52, 54 may also have a lower transition panel 92, 94 that slopes inward from the respective front panel 60, 62 toward the front wall 44 when the hoods are closed. The rear transition panels 88, 90 and the lower transition panels 92, 94 further encourage water runoff and add to an aesthetically pleasing design.

Figure 2:
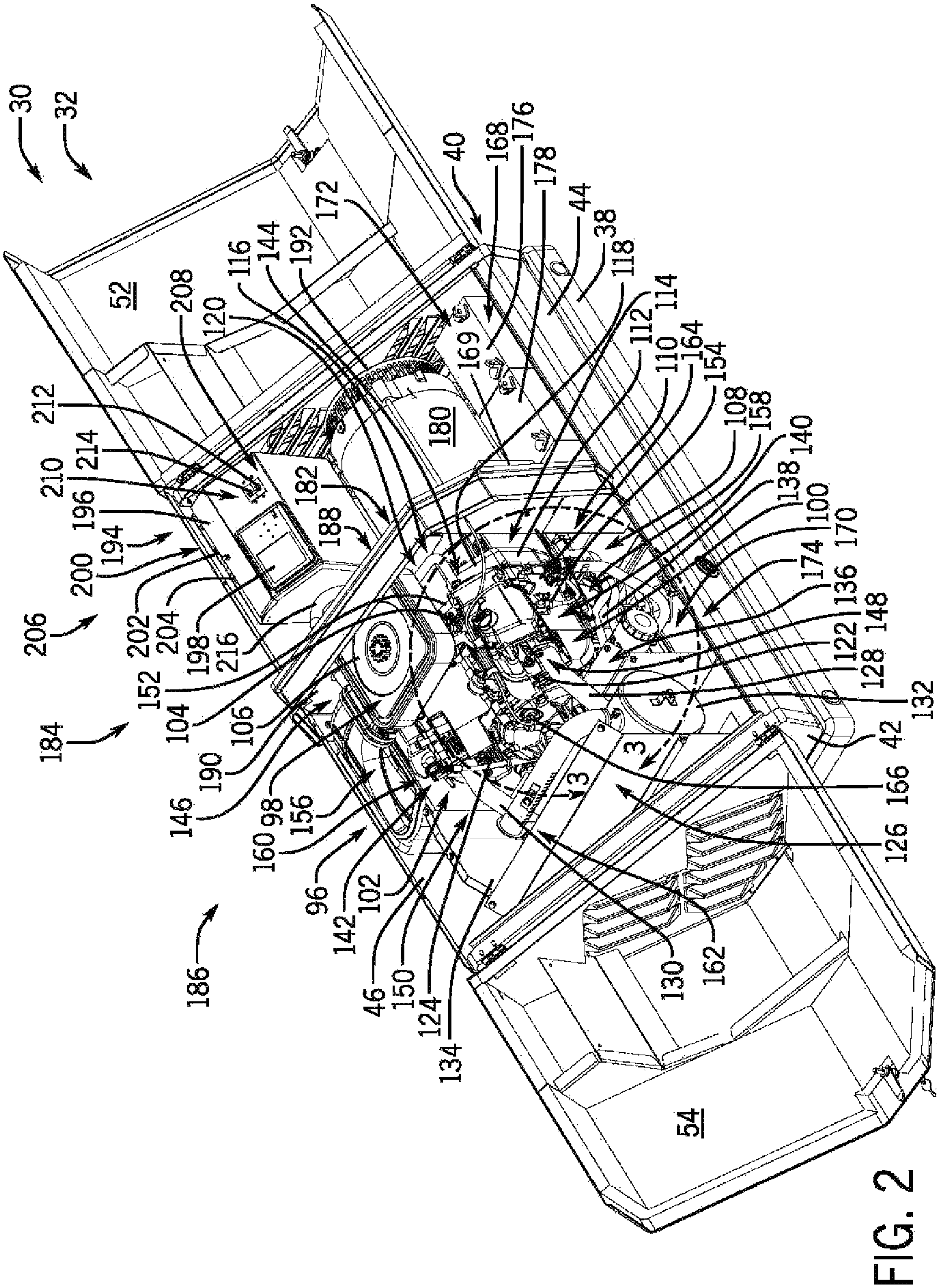
FIG. 2 is a perspective view similar to FIG. 1 with left and right doors opened to expose the electrical generator components within, according to an embodiment of the invention.

Referring now to FIG. 2, a perspective view of the generator 30 is shown with the first hood 52 and second hood 54 open to expose electrical generator components within, according to an embodiment of the invention. FIG. 2 shows an engine assembly 96 comprising an internal combustion engine 98 having two cylinders 100, 102 (e.g. a v-twin engine), with each cylinder 100, 102 receiving a fuel and air mixture from a carburetor 104 located between or slightly above the cylinders 100, 102. The carburetor 104 mixes air with a gaseous or liquid fuel, e.g. liquefied petroleum gas or gasoline, and supplies the mixture to the cylinders 100, 102. The carburetor 104 can be coupled to receive air from an air filter 106 mounted on a top portion of the engine 98. In operation, movement of the cylinders is utilized to drive rotation of a crankshaft coupled to the motor, so as to provide for power generation from generator 30.

The engine assembly preferably includes an engine cooling fan 108 that drives a stream of air over the cylinders 100, 102 of the engine 98 to provide cooling thereto, such that the engine 98 may be an air-cooled engine. The cooling fan 108 is mounted to a crankshaft 110, so as to be operatively coupled to the crankshaft 110 and such that the fan 108 is driven thereby. A fan cover 112 is mounted over the engine cooling fan 108 and preferably includes an airflow opening 114 surrounding the crankshaft 110, such that the engine fan 108 may draw a stream of cooling air into the airflow opening 114. The fan cover 112 may be mounted over a front side of the engine 98 and may generally be characterized as including a main section 116 that covers the engine fan 108 and a first arm 118 and second arm 120 each extending from the main section to cover a front side of a respective cylinder 100, 102. For instance, the fan cover 112 is shown mounted over the engine cooling fan 108 and over sides of two cylinder blocks 122, 124 of the cylinders 100, 102. The engine fan 108 preferably drives cooling air from the main section 116 through the first arm 118 and the second arm 120 to the cylinders 100, 102.

The engine 98 may also include an exhaust system 126 operatively coupled to the engine 98. The exhaust system 126 may comprise one or more exhaust pipes 128, 130 extending from the engine 98 in a direction downstream from the engine cooling fan 108, and a muffler 132 may be coupled to at least one of the one or more exhaust pipes 128, 130. The muffler 132 may be positioned within a muffler box 134. The muffler box 134 can surround the muffler 132, managing heat transfer from the muffler 132 within the enclosure 32. The muffler box 134 may extend approximately from the engine 98 to the second sidewall 42 and approximately from the front wall 44 to the back wall 46 of the enclosure 32. The muffler box 134 may mount to the base 38 of the enclosure 32 and extend to a height above cylinders 100, 102 of the engine 98. The exhaust pipes 128, 130 may extend through an opening 136 into the muffler box 134, with the opening 136 positioned in an airflow path downstream from the engine fan 108. The muffler box 134 receives cooling air expelled from the engine 98 through the opening 136 and cools the muffler 132 by directing the cooling air over the muffler 132. The muffler box 134 may also direct the cooling air out of the enclosure 32 through vents in the second sidewall 42.

As referred to previously, the internal combustion engine 98 may comprise a v-twin or opposed-twin engine having two cylinders 100, 102. However, the engine 98 could comprise a single cylinder engine or an engine with any number of cylinders appropriate to operate the generator 30. Each cylinder 100, 102 extends from a crankcase 138 and includes a cylinder head 140, 142 mounted on a cylinder block 122, 124 to define a combustion chamber. Each cylinder head 140, 142 includes an intake port 144, 146 to receive a fuel and air mixture and an exhaust port 148, 150 to expel exhaust gas following combustion. The fuel and air mixture is provided to each intake port 144, 146 through an intake manifold 152 coupled to the carburetor 104. The exhaust gas is expelled from each exhaust port 148, 150 through the exhaust system 126 which may include an exhaust pipe 128, 130 coupling each respective exhaust port 148, 150 to the muffler 132. Each cylinder 100, 102 also includes a spark plug 154, 156 shown coupled to each cylinder head 140, 142 extending into the respective combustion chamber to initiate combustion in the respective cylinder. Each cylinder 100, 102 also includes a piston (not shown) connected to the crankshaft 110, with combustion in each cylinder driving the piston to rotate the crankshaft.

Each cylinder 100, 102 also preferably includes an ignition coil 158, 160 to initiate sparking of each respective spark plug 154, 156. Each ignition coil 158, 160 wires to the respective spark plug 154, 156 to provide a voltage to initiate sparking of the spark plug. The v-twin engine 162 may have one ignition coil 158, 160 for each spark plug 154, 156, although other embodiments may use one ignition coil servicing two or more spark plugs. In a preferred embodiment, a digital ignition module 164, also referred to as a programmable ignition module, couples to each ignition coil 158, 160 to control ignition timing of each spark plug 154, 156. The digital ignition module 164 can be programmed to control ignition timing based upon engine speed or engine load to optimize engine performance. The digital ignition module 164 can also interrupt or stop sparking of each spark plug 154, 156 to initiate engine shutdown. The digital ignition module 164 is shown wired to an inductive pickup 166, also referred to as a magnetic pickup or inductive sensor, mounted on the crankcase 138 to receive timing information used to calibrate ignition timing of each spark plug 154, 156.

In a preferred embodiment, a battery system 168 having sufficient power and charging capability can be wired to the programmable ignition module 164 to provide power thereto. The battery system 168 may be charged by a power supply 169 that may receive power from either the generator 30 or an external power source. The power supply 169 can also be directly coupled to the ignition module 164 to supply power thereto. The digital ignition module 164 may couple the battery system 168 to each of the one or more ignition coils 158, 160 to provide power to each of the spark plugs 154, 156. Alternatively, the battery system 168 may provide power directly to the ignition coils 158, 160 via an electrical connection from the battery system to the ignition coils, with the ignition module 164 separately coupled to control the ignition coils 158, 160. The battery system 168 can also power additional control systems of the generator 30 and run a starter motor 170 to startup the engine 98. The battery system 168 provides a consistent ignition voltage (e.g. 24-volts) to the ignition coils 158, 160 during engine 98 operation, although voltage may drop slightly while cranking the engine during startup.

In one embodiment of the invention, the battery system 168 may include a 24-volt battery system 172, with each of the one or more ignition coils 158, 160 operating on 24-volts. Thus, the programmable ignition module 164 may supply 24-volts from the 24-volt battery system 172 to operate each of the one or more ignition coils 158, 160. Alternatively, the one or more ignition coils 158, 160 may operate on 24-volts supplied directly from the battery system 168 while controlled by the ignition module 164. In addition, the starter motor 170 may comprise a 24-volt starter motor 174 powered by the 24-volt battery system 172. The 24-volt battery system 172 is shown in FIG. 2 comprising two 12-volt batteries 176, 178 coupled in series to provide the 24-volts. However, one of the batteries 176, 178 could be a 24-volt battery connected to supply 24-volts to the digital ignition module 164 and/or the ignition coils 158, 160. In other embodiments of the invention, the digital ignition module 164 and/or the ignition coils 158, 160 may operate on 12-volts supplied from one of the 12-volt batteries 176, 178, or could operate on any other suitable voltage level supplied from a battery system having a corresponding voltage. For instance, the digital ignition module 164 and/or the ignition coils 158, 160 may operate on more than 24-volts, e.g. 36-volts, 48-volts, etc. Accordingly, the power supply 169 may provide a corresponding voltage to the battery system 168 and/or the ignition module 164, e.g. 12-volts, 24-volts, 36-volts, 48-volts, etc.

As shown in FIG. 2, the engine 98 preferably drives an alternator 180 to produce electricity for distribution from the generator 30. The alternator 180 has an alternator shaft 182 operatively mounted to the crankshaft 110. An alternator adaptor (not shown) couples the alternator 180 to the engine 98 on an opposite side of the crankcase 138 from the inductive pickup 166, with the alternator adaptor aligning the alternator shaft 182 to the crankshaft 110. The alternator 180 and the engine 98 may be mounted in separate chambers 184, 186 of the enclosure 32 with the alternator adaptor extending through an opening 188 in a partition wall 190 separating the chambers. The alternator 180 and the battery system 168 can be positioned in a first chamber 184 so as not to be heated by the internal combustion engine 98 positioned in a second chamber 186 of the enclosure 32. The alternator 180 includes an alternator fan 192 on an opposite side of the alternator from the engine 98 to draw cooling air axially through the alternator from an opening in the back wall 46.

The standby generator 30 also includes a control system 194 to control operation of the generator. The control system 194 is housed within a control box 196 mounted to the back wall 46 of the enclosure 32 adjacent the first sidewall 40, and may be powered by the battery system 168. The control system 194 includes a touch screen display 198 located on an outer surface of the control box 196 to receive operator control inputs and display operational characteristics of the generator 30. The control system 194 can be programmed to operate the digital ignition module 164 according to preset or operator-controlled parameters. The control box 196 may house an electrical system 200 coupled to the alternator 180 to distribute power produced by the alternator 180 from the generator 30. The electrical system 200 may include distribution lines 202, 204 routed from the alternator 180 into the control box 196 and out of the generator 30 through an opening 206 in the back wall 46 of the enclosure 32. The control box 196 may include circuit breakers 208, 210 coupled along the distribution lines 202, 204 with operator controls 212, 214 on the outer surface of the control box 196 to selectively interrupt power distribution from the generator 30. A fuel line 216 can also be routed from the opening 206 in the back wall 46 through the control box 196 to the engine 98.

Figure 3:
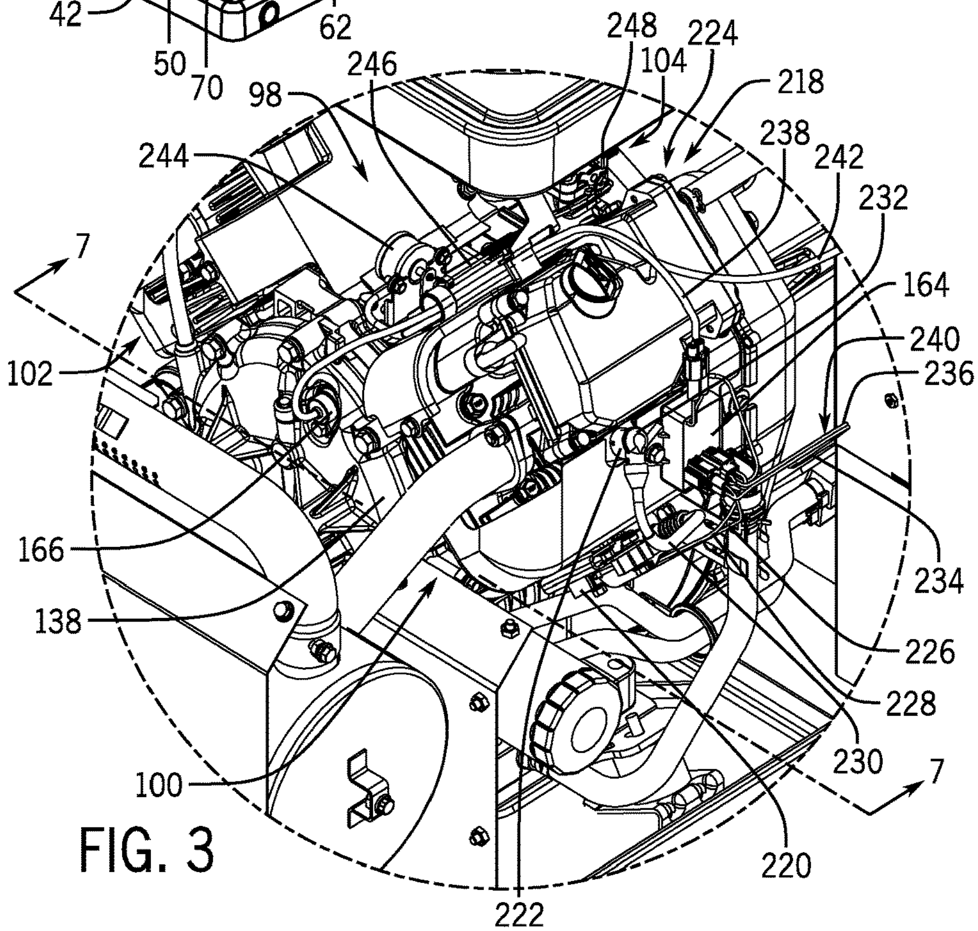
FIG. 3 is a detail view of the generator of FIG. 2 taken along line 3-3 of FIG. 2 showing an electronic ignition system of a generator engine, according to an embodiment of the invention.

Referring now to FIG. 3, a battery-operated ignition system 218 is shown, in accordance with an embodiment of the invention. The battery-operated ignition system 218, also referred to as an electronic ignition system, preferably includes an ignition coil 220 and a spark plug 222 for each cylinder 100, 102 of the engine 98, with the ignition coil 220 wired to power the spark plug 222. Also, the battery-operated ignition system 218 preferably includes the digital ignition module 164 to operate each ignition coil 220 and spark plug 222. The battery-operated ignition system 218 may include an inductive pickup 166 that couples to the crankcase 138, and the digital ignition module 164 can be wired to receive data from the inductive pickup 166. The digital ignition module 164 may couple to the one or more ignition coils 220 and can use the data received from the inductive pickup 166 to control ignition timing of each spark plug 222. The battery-operated ignition system 218 may also include a battery system 168 (FIG. 2) to power the digital ignition module 164 and each ignition coil 220. The battery-operated ignition system 218 may comprise a 24-volt battery-operated ignition system 224.

The battery-operated ignition system 218 can be wired to power each spark plug 222 of the one or more cylinders 100, 102. The ignition module 164 is shown wired to an ignition coil 220 for each cylinder 100, 102 via a pair of ignition coil wires 226, 228. The ignition coil 220 may power a spark plug 222 via another ignition coil wire 230 coupled to an ignition cap 232 on the spark plug. The ignition module 164 is further shown coupled to a battery wire 234, a grounding wire 236, and to the inductive sensor 166 via an inductive sensor wire 238. The ignition module 164 may also couple to an ignition kill switch wire 240 to receive a signal from a control system instructing the ignition module 164 to kill the engine 98. FIG. 3 also shows a stepper motor wire 242 to control a stepper motor 244 that operates a link rod 246 to a throttle lever 248 of the carburetor 104.

Figure 4:
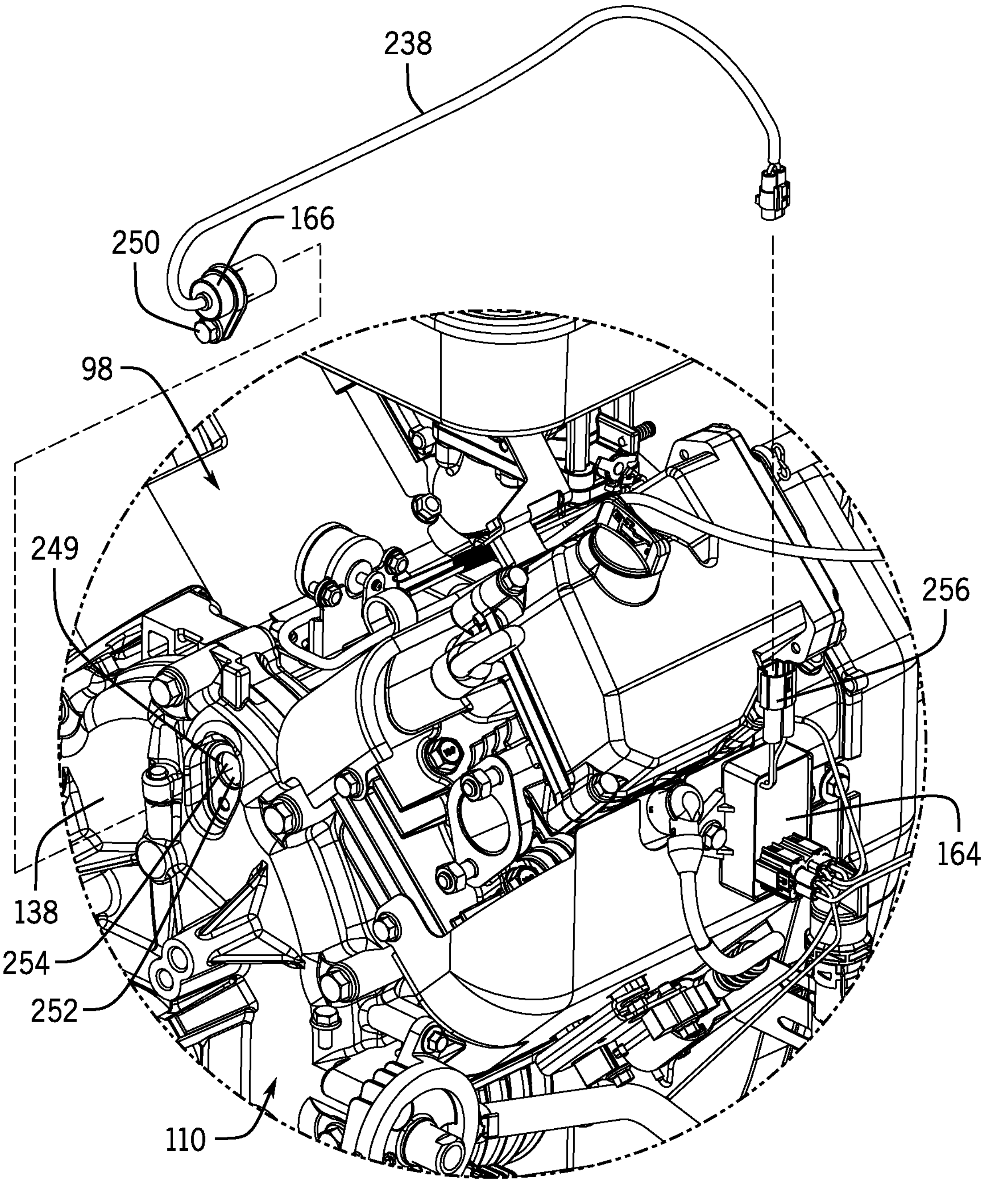
FIG. 4 is a detail view of part of the engine of FIG. 3 taken at a similar angle of the detail view of FIG. 3 but with an inductive pickup exploded from the engine, according to an embodiment of the invention.

Referring now to FIG. 4, a detail view of part of the engine 98 taken at a similar angle of the detail view of FIG. 3 is shown, according to an embodiment of the invention. FIG. 4 shows the inductive pickup 166 exploded from the engine 98. As referred to previously, the inductive pickup 166 senses a rotation of an engine component and provides timing information related to the rotating component to the programmable ignition module 164. That is, each time a timing indicator, e.g. a hole or magnet, in a rotating part of the engine 98, e.g. a cam gear or flywheel, rotates past the inductive sensor/inductive pickup 166, an electrical pulse is generated by the inductive pickup 166 that indicates an angular position of the rotating part of the engine. The ignition module 164 uses the pulse to calculate the angular position of the crankshaft 110 as well as the engine speed (by measuring the length of time between successive pulses). The ignition module 164 can use one or more timing indicators, e.g. pulses corresponding to one or more holes or magnets in a rotating part of the engine 98, to calculate the angular position of the crankshaft 110 as well as the engine speed.

The inductive pickup 166 may extend through an opening 249 into the crankcase 138 and fasten to the crankcase with a fastener 250, for example a bolt. FIG. 4 shows the opening 249 in the crankcase 138 located adjacent a camshaft 252 having a cam gear 254 driven by the crankshaft 110, such that the camshaft 252 can be in direct communication with the crankshaft 110. The inductive pickup 166 senses each revolution of the cam gear 254 and sends an electrical pulse to the ignition module 164 representing rotational data of the camshaft 252. The inductive sensor wire 238 of the inductive pickup 166 couples to the ignition module 164 via a pair of mating connector plugs 256. Since the cam gear 254 is geared to the crankshaft 110, the electrical pulse sent by the inductive sensor wire 238 to the ignition module 164 also represents rotational data of the crankshaft 110.

Figure 5:
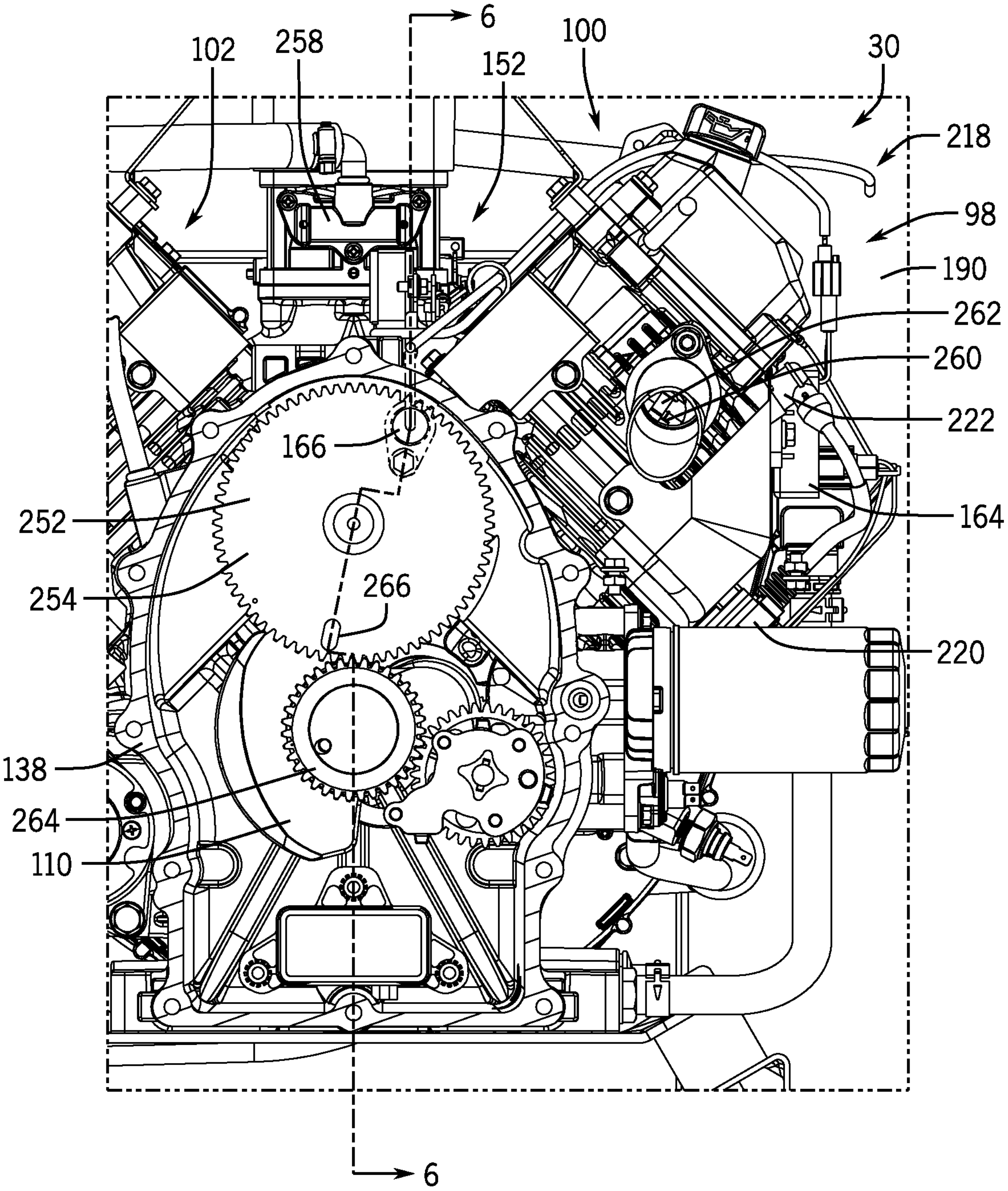
FIG. 5 is a partial cross-sectional view of the generator of FIG. 2 showing a generator engine from an end of the engine opposite a right side of the generator with an end cover of a crankcase of the engine hidden exposing internal components therein, according to an embodiment of the invention

Referring now to FIG. 5, a partial cross-sectional view of the generator 30 is shown from an end of the engine 98 opposite the partition wall 190, with an end cover of the crankcase 138 hidden thereby exposing internal components therein, according to an embodiment of the invention. The embodiment of FIG. 5 shows a fuel and air mixer 258 located between the cylinders 100, 102 to mix gaseous fuel with air and provide the gaseous fuel and air mixture to each cylinder via an intake manifold 152. Each cylinder 100, 102 includes an intake valve 260 and an exhaust valve 262 to actuate between open and closed positions regulating fuel flow through the cylinder 100, 102. Each cylinder 100, 102 also includes a spark plug 222 configured to initiate combustion of the fuel in the cylinder 100, 102.

A camshaft 252 is shown in the crankcase 138 driven by the crankshaft 110 and coupled to actuate each intake valve 260 and each exhaust valve 262 of the one or more cylinders 100, 102 according to a rotational position of the crankshaft 110. The camshaft 252 has a cam gear 254 that is driven by a drive gear 264 of the crankshaft 110. The cam gear 254 includes a slot 266 formed proximate an outer circumference of the cam gear 254, and the slot length is aligned with the center of rotation of the camshaft 252. The inductive pickup 166 can mount to the crankcase 138 adjacent the cam gear 254 configured to sense a rotational position of the camshaft 252. That is, the inductive pickup 166 may be positioned at a radial distance from the center of rotation of the camshaft 252 equivalent to that of the slot 266 such that the inductive pickup senses the slot each revolution of the camshaft 252.

The digital ignition module 164 of the battery-operated ignition system 218 may be wired to the inductive pickup 166 to receive a signal on a sensed rotational position of the camshaft 252. The digital ignition module 164 can be programmed to receive the electrical pulse from the inductive sensor 166 comprising rotational data of the camshaft 252 and use the data to determine a rotational position of the camshaft 252. For example, the ignition module 164 can be programmed to determine an angular position of the camshaft 252 at each pulse. The ignition module 164 can also be programmed with a timer to determine a time period between each pulse, and to calculate an rpm of the camshaft 252 based on the time period between pulses. The ignition module 164 can be programmed to use a known location of the camshaft 252 at each pulse with the determined rpm of the camshaft 252 to calculate a rotational position of the camshaft 252 after/between pulses. The ignition module 164 can also be programmed to determine a crankshaft 110 angular speed/position at or between each pulse using information on the angular speed/position of the camshaft 252.

The digital ignition module 164 may be programmed to operate each spark plug 222 based on the signal received from the inductive pickup 166. That is, the digital ignition module 164 can be programmed to control ignition timing of the one or more spark plugs 222 based on the rotational position of the crankshaft 110, and the ignition module 164 may be programmed to fire each ignition coil 220/spark plug 222 once every revolution of the camshaft 252. The digital ignition module 164 may be programmed to advance or retard ignition timing of each spark plug 222 based on preferred operating parameters of the engine 98. The ignition module 164 could be programmed to control ignition timing based upon different engine speeds or engine load point to optimize engine 98 performance, e.g. based on speed or load. Also, the digital ignition module 164 can be programmed to delay or retard ignition timing during starting events. For example, the digital ignition module 164 may be programmed to fire each spark plug 222 at 20 degrees before top dead center for an optimized engine performance during normal generator 30 operation, but could be programmed to fire each spark plug 222 at zero degrees top dead center temporarily for improved startup.

Figure 6:
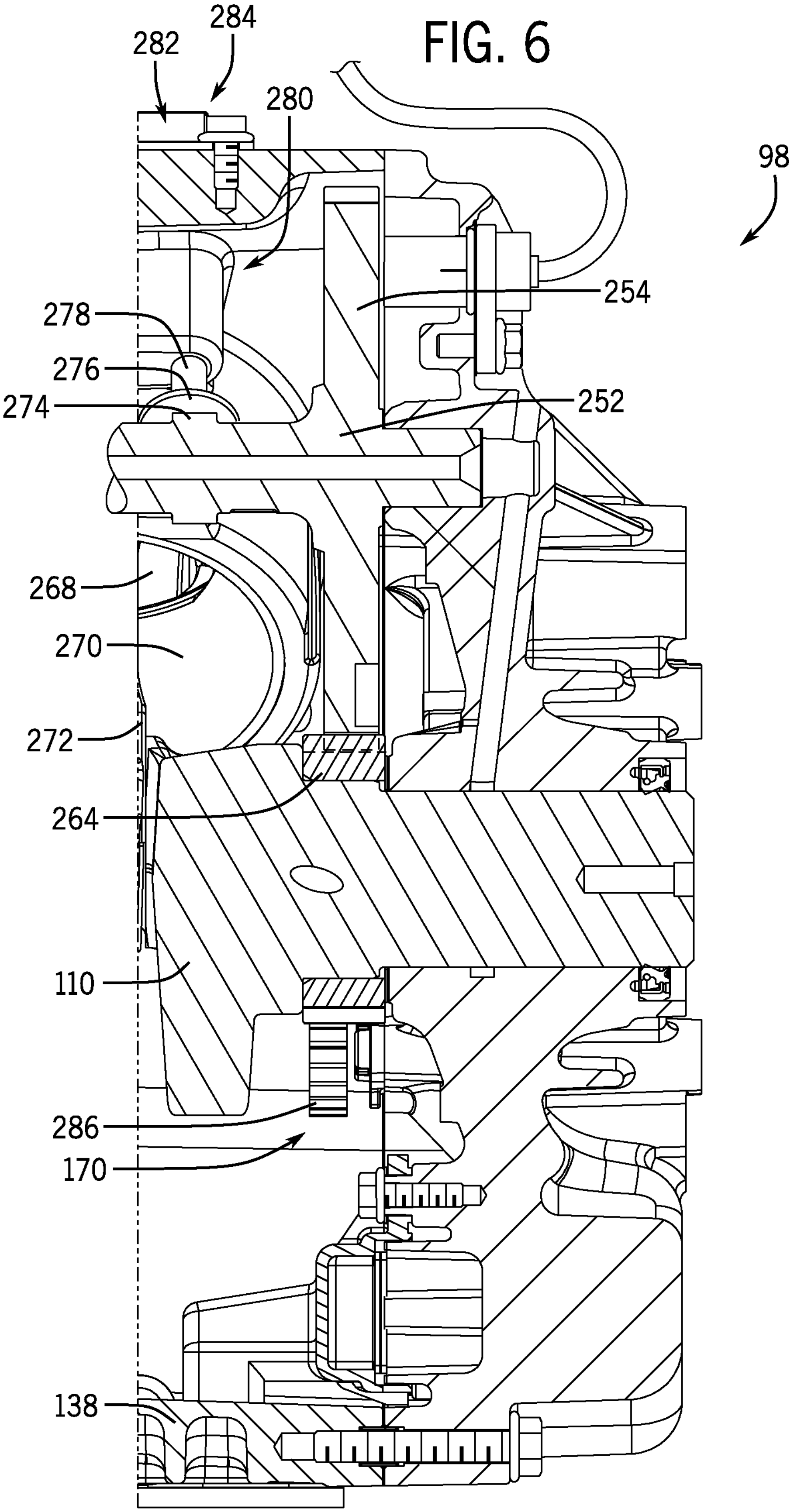
FIG. 6 is a partial cross-sectional view of the generator of FIG. 5 taken along line 6-6 of FIG. 5 showing a crankshaft of the engine driving a piston and a camshaft, in accordance with an embodiment of the invention.

Referring now to FIG. 6, a partial cross-sectional view of the generator 30 of FIG. 5 taken along line 6-6 of FIG. 5 is shown, in accordance with an embodiment of the invention. FIG. 6 shows the engine 98 including a piston 268 operatively positioned in each cylinder 270 of the engine. Each piston 268 couples to the crankshaft 110 by a respective connecting rod 272 such that combustion in each cylinder 270 causes each piston 268 to drive the crankshaft 110. The camshaft 252 is shown positioned in the crankcase 138 driven by the crankshaft 110. The camshaft 252 includes a cam gear 254 coupled to a drive gear 264 of the crankshaft 110. The camshaft 252 includes cams 274 that operate cam followers 276 coupled to pushrods 278 in each cylinder head 280. The pushrods 278 extend to operate rocker components 282 located in the rocker box 284 that actuate a corresponding intake valve 260 (FIG. 5) and exhaust valve 262 (FIG. 5). The drive gear 264 of the crankshaft 110 also couples to a mating gear 286 of the starter motor 170.

Figure 7:
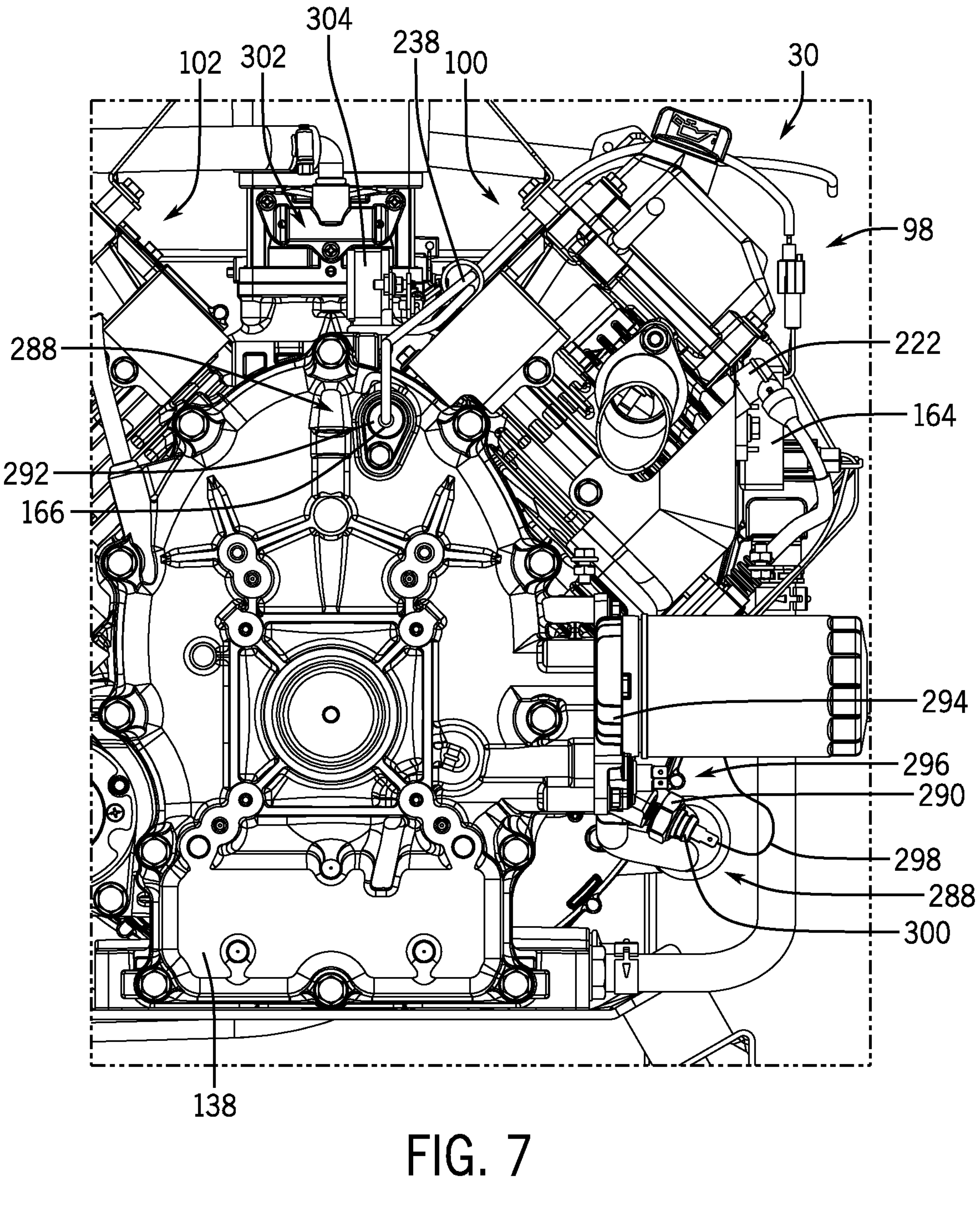
FIG. 7 is a partial cross-sectional view of the generator of FIG. 3 taken along line 7-7 of FIG. 3, according to an embodiment of the invention.

Referring now to FIG. 7, one or more sensors 288, also referred to as safety sensors, mounted on or within the generator 30 is shown, in accordance with an embodiment of the invention. The one or more sensors 288 obtains data on an operating characteristic of the generator 30. The operating characteristic of the generator 30 may comprise an oil level measurement, an oil pressure measurement, and/or a speed level measurement of the spark-ignition engine 98. Accordingly, the one or more sensors 288 may comprise an oil level or pressure sensor 290 and/or a speed level sensor 292. FIG. 7 shows the speed level sensor 292 comprising the inductive pickup 166 mounted to the crankcase 138. The speed level sensor 292 may be wired to the ignition module 164 via an inductive sensor wire 238. As discussed previously, the inductive pickup 166 couples to the engine 98 to sense a rotation of the camshaft 252 (FIG. 6) driven by the crankshaft 110 (FIG. 6), and thus can provide information to the ignition module 164 used to determine a speed level of the engine 98.

FIG. 7 also shows an oil pressure sensor 290 coupled to an oil filter adaptor 294 and an oil cooler 296 of the crankcase 138 to sense oil pressure of the engine 98. Upon sensing a low oil pressure, the oil pressure sensor 290 may send a signal via a low oil shutdown wire 298 to the ignition module 164 indicating a low oil pressure. The oil pressure sensor 290 may include a low oil shutdown switch 300. The low oil shutdown switch 300 is preferably normally closed and remains closed upon the oil pressure sensor 290 sensing a normal engine oil pressure but opens upon the sensor sensing a low oil pressure below a predetermined level. The normally closed low oil shutdown switch 300 can signal a low level or pressure of engine oil to the ignition module 164 by interrupting a signal indicating a normal level or pressure of oil. Alternatively, the low oil shutdown switch 300 may comprise a normally open switch that closes to send a signal indicating a low level or pressure of oil. In one embodiment of the invention, the sensed low oil pressure below a predetermined level may be at or below 5 psi, 7 psi, or 10 psi, or any suitable oil pressure that corresponds to a low level of oil in the engine.

The digital ignition module 164 may be programmed to receive data on an operating characteristic of the generator 30 from each of the one or more sensors 288. The ignition module can be programmed to control operation of each spark plug 222 based on the data received from the one or more sensors 288 on an operating characteristic of the generator 30. In one embodiment of the invention, each of the one or more sensors 288 can measure an oil level, an oil pressure, or an engine speed. The digital ignition module 164 may be programmed to receive measurement data from the one or more sensors 288 indicating an oil level, an oil pressure, and/or an engine speed, and compare the measurement data with a predetermined respective low oil level, low oil pressure, or overspeed condition to determine if the measurement data indicates a low oil level, a low oil pressure, or an overspeed condition. When the measurement data indicates a low oil level, a low oil pressure, or an overspeed condition, the ignition module 164 may be programmed to interrupt operation of the one or more spark plugs 222 to stop the engine. Accordingly, the ignition module 164 can interrupt spark ignition of the combustible fuel upon determining the received data indicates a predetermined characteristic of the generator 30 is outside an acceptable range, e.g., a low oil level, a low oil pressure, and/or an overspeed condition. The one or more sensors 288 (e.g. the oil pressure sensor 290 or speed level sensor 292) could be wired directly to the control system 194 (FIG. 2) which could control the ignition module 164 to interrupt engine 98 operation upon the one or more sensors 288 measuring a predetermined characteristic of the generator 30.

FIG. 7 also shows the spark-ignition engine 98 comprising a fuel injection system 302 to provide combustible fuel to each of the one or more cylinders 100, 102. The digital ignition module 164 may be coupled to the fuel injection system 302 to control supply of the combustible fuel to each of the one or more cylinders 100, 102. That is, the internal combustion engine 98 can include a fuel injection system 302 controlled by the programmable ignition module 164 to provide fuel to each cylinder 100, 102. The digital ignition module 164 may be programmed to interrupt spark ignition of the combustible fuel by controlling the fuel injection system 302 to interrupt supply of the combustible fuel to each of the one or more cylinders 100, 102. The fuel injection system 302 may comprise a fuel solenoid 304 to control fuel provided to each cylinder 100, 102, which may be coupled to either of the carburetor 104 of FIG. 3 or the fuel and air mixer 258 of FIG. 5 to control the supply of fuel to the engine 98. Referring back to FIG. 7, the ignition module 164 (or the control system 194 of FIG. 2) may be programmed to stop engine operation by substantially simultaneous interruption of both fuel injection from the fuel injection system 302 and spark ignition from each spark plug 222.

Figure 8:
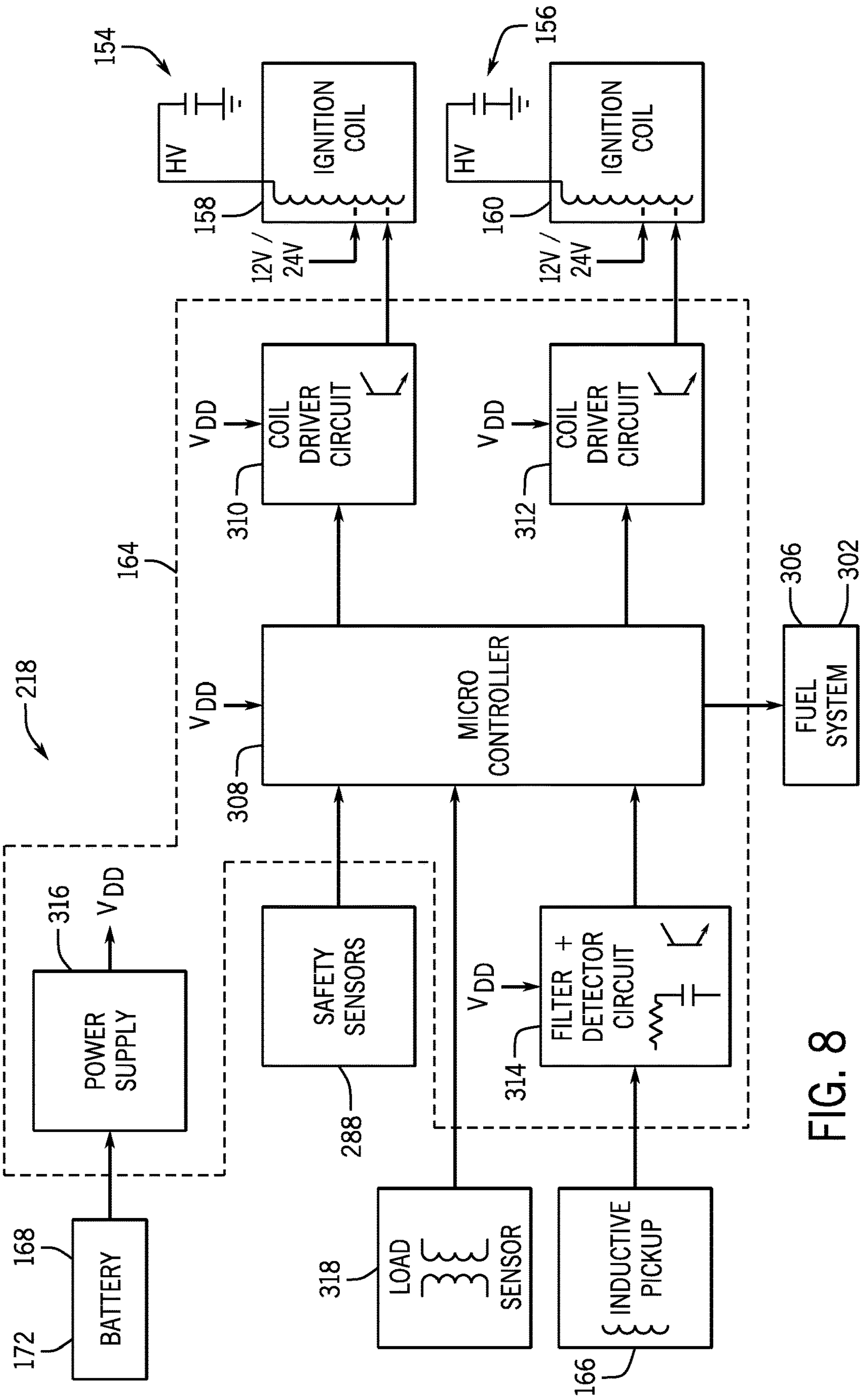
FIG. 8 is an electrical schematic of an electronic ignition system coupled to a fuel system, according to an embodiment of the invention.

Referring now to FIG. 8, an electrical schematic of a battery-operated ignition system 218 coupled to a fuel system 306 is shown, according to an embodiment of the invention. The ignition module 164 is shown comprising a microcontroller 308, two coil driver circuits 310, 312, a filter and detector circuit 314, and/or a power supply module 316. However, the ignition module 164 may comprise additional or fewer components than those shown in FIG. 8. The ignition module 164 may be coupled to two ignition coils 158, 160 with each ignition coil coupled to a respective spark plug 154, 156. The ignition module 164 may couple to one or more of a battery system 168, one or more safety sensors 288, a load sensor 318, an inductive pickup 166, and/or the fuel system 306.

The digital ignition module 164 may include a microcontroller 308 to control operation of the battery-operated ignition system 218. The microcontroller 308 can control each coil driver circuit 310, 312 such that the microcontroller 308 controls ignition timing of each ignition coil 158, 160. The microcontroller 308 can read an input received from the inductive pickup 166 and use the input to calculate rotational speed and angular position of the crankshaft 110 (FIG. 6). Based on the crankshaft 110 (FIG. 6) position and/or speed, the microcontroller 308 determines a charging time to begin charging each ignition coil 158, 160 (starting a dwell period) and a firing time to turn off each ignition coil (firing each ignition coil) to initiate a spark from each spark plug 154, 156. The microcontroller 308 can also determine the ignition timing of each cylinder 270 (FIG. 6) relative to the respective piston 268 (FIG. 6) position/crankshaft 110 (FIG. 6) angle. The microcontroller 308 may determine the firing time of each ignition coil 158, 160 in part based on engine configuration including, for example, the angular position of the one or more cylinders 270 (FIG. 6), total number of cylinders, firing order of each cylinder, etc. The microcontroller 308 can determine ignition timing based on engine speed, since more ignition advance at higher engine speed can result in more efficient engine operation, and the microcontroller 308 can also determine or modify ignition timing based on engine load to optimize engine performance.

As referred to previously, ignition module 164 can be programmed to shut down the engine by stopping fuel flow to each cylinder or stopping the spark plugs 154, 156 from firing. For instance, the microcontroller 308 may be programmed to shut down the engine if the one or more sensors 288 measure an unsafe operation condition, e.g. a low oil pressure or an overspeed condition. The one or more sensors 288 can inform the microcontroller 308 of an unsafe operating condition causing the microcontroller 308 to shut down the engine preventing engine damage. The microcontroller 308 may also be wired to the control system 194 (FIG. 2) and programmed to shut down the engine if an operator indicates a "stop engine" or shutdown command from an operator switch, i.e. at the touch screen display 198 (FIG. 2) of the control system. Since the one or more sensors 288 and the control system 194 (FIG. 2) may comprise external inputs to the ignition module 164, the microcontroller 308 can be programmed to shut down the engine upon receipt of a shutdown command from an external input.

The microcontroller 308 may be programmed to shut down the engine by interrupting sparking of the spark plugs 154, 156 or controlling fuel flow to each cylinder. For instance, the fuel injection system 302 could shut off fuel flow to each cylinder 100, 102 (FIG. 7) responsive to a microcontroller 308 initiated shutdown. The microcontroller 308 can slow the engine by initiating shutdown responsive to a detected overspeed condition and resume engine operation once the engine speed falls to an acceptable speed level. Typically, engine shutdown can be a terminal event where the engine shuts down to a full stop. However, an external control input from the microcontroller 308 to the fuel injection system 302 can initiate shutdown of the engine and optionally control the fuel injection system 302 to resume engine operation once the engine speed has fallen to an acceptable level.

The digital ignition module 164 may include a filter and detector circuit 314 to digitize the rotational data received from the inductive pickup 166. Since the magnitude of the signal generated by the inductive pickup 166 can vary based on engine speed, the signal has an analog waveform that may not be suitable for direct input to the microcontroller 308, and may also contain electrical noise. The filter and detector circuit 314 wires to the inductive pickup 166 to digitize a signal from the inductive pickup 166 on the sensed rotational position of the camshaft 252 (FIG. 6). The filter and detector circuit 314 filters unwanted noise from the signal, compensates for variations in amplitude of the signal, and provides a clean and well defined digital timing signal to the microcontroller 308 to trigger ignition. The microcontroller 308 may be programmed to receive the digitized signal from the filter and detector circuit 314 and control each coil driver circuit 310, 312 based on the digitized signal.

The digital ignition module 164 may include a power supply module 316 to receive power from an external power source and power components or circuitry of the ignition module 164. The digital ignition module 164 can be configured to receive any suitable voltage from a power source and convert that voltage to any other suitable voltage to operate components or circuitry of the ignition module 164. For instance, the power supply module 316 can reduce an unregulated voltage from a battery source to one or more lower voltages used by other components or circuitry of the ignition module 164. In one embodiment, the power supply module 316 may wire the 24-volt battery system 172 to each of the microcontroller 308 and the one or more coil driver circuits 310, 312. The power supply module 316 may reduce a voltage received from the 24-volt battery system 172 to 12-volts supplied to operate the one or more coil driver circuits 310, 312 and 5-volts supplied to operate the microcontroller 308. In another embodiment, the power supply module 316 may reduce a voltage received from a 12-volt battery system to 5-volts supplied to operate the microcontroller 308, while supplying 12-volts from the 12-volt battery system to operate the one or more coil driver circuits 310, 312.

The programmable ignition module 164 may include a separate coil driver circuit 310, 312 coupled to each of the one or more ignition coils 158, 160 to control operation thereof. The coil driver circuit 312, 310 may comprise a power transistor circuit that provides current to the ignition coils 158, 160, cutting off current to the ignition coils to fire each spark plug 154, 156. More specifically, one or more coil driver circuits 310, 312 may each couple the microcontroller 308 to a respective ignition coil 158, 160 to amplify a control signal from the microcontroller 308 to the respective ignition coil. The coil driver circuit 310, 312 may use low current, low-voltage logic level signals received from the microcontroller 308 to transmit higher-current, higher-voltage signals to drive the ignition coils 158, 160.

The ignition coils 158, 160 can increase a voltage of an ignition signal from the coil driver circuits 310, 312 to a high voltage required to fire each respective spark plug 154, 156 igniting the fuel-air mixture in each combustion chamber of the engine. Each of the ignition coils 158, 160 preferably operates on a voltage from the battery system 168, directly or indirectly (e.g. indirectly via the ignition module 164). Each ignition coil 158, 160 can increase an ignition signal voltage by transforming a voltage from the battery system 168 to the high voltage required to create an electric spark at the respective spark plug 154, 156. Since the battery system 168 may comprise a 24-volt battery system 172, each of the one or more ignition coils 158, 160 may operate on 24-volts from the 24-volt battery system 172.

The generator 30 (FIG. 7) may comprise a load sensor 318 mounted on or within the generator to measure an engine load on the internal combustion engine 98 (FIG. 7). The load sensor 318 may comprise a current transformer coupled externally from the battery-operated ignition system 218, or may be part of the battery-operated ignition system 218. The load sensor 318 may be coupled to components shown in FIG. 2 including the alternator 180, electrical system 200, distributions lines 202, 204, or any suitable location on the generator 30 to measure an electrical load on the generator 30, which also corresponds to a measured engine load on the engine 98. Referring back to FIG. 8, the digital ignition module 164 may be programmed to receive a sensor input comprising load data from the load sensor 318 indicating a measured engine load on the internal combustion engine. The digital ignition module 164 may be programmed to operate the one or more ignition coils 158, 160 based upon data received from the load sensor 318 on a measured engine load. By controlling the ignition coils 158, 160, the digital ignition module 164 can be programmed to control ignition timing of each spark plug 154, 156 based upon the sensor input received from the load sensor 318. The digital ignition module 164 can also be programmed to optimize ignition timing of each spark plug 154, 156 of the respective cylinders 100, 102 (FIG. 7) based on the load data. Thus, the ignition system can modify its control characteristics (ignition timing) based on the amount of load on the generator (and therefore on the engine).

Beneficially, embodiments of the invention thus provide a standby generator having an internal combustion engine driving an alternator to produce electricity, with the internal combustion engine comprising an electronic ignition system. The internal combustion engine preferably includes one or more cylinders each having a spark plug coupled to a respective ignition coil to receive a voltage therefrom. Each ignition coil may receive power from a battery system electrically coupled to the electronic ignition system. The engine preferably includes a digital ignition module coupled to operate each ignition coil to control ignition timing of each spark plug. The electronic ignition system may be programmed to control ignition timing based on engine speed or engine load to optimize generator performance. The electronic ignition system may further provide a constant ignition voltage to each ignition coil to ensure a consistent spark from each spark plug, and thereby improve combustion within each cylinder.

Therefore, according to one embodiment of the invention, a standby generator includes an alternator to produce electricity for distribution to an electrical system, and an air-cooled internal combustion engine driving the alternator. The air-cooled internal combustion engine includes one or more cylinders, one or more spark plugs each configured to initiate combustion in a corresponding cylinder, and one or more ignition coils each coupled to a respective spark plug of the one or more spark plugs to provide a voltage to the respective spark plug. The standby generator also includes a battery system electrically coupled to the one or more ignition coils to provide power thereto, and a digital ignition module wiring the battery system to each of the one or more ignition coils to control operation of the one or more spark plugs.

According to another embodiment of the invention, a generator includes an internal combustion engine having a crankcase and one or more cylinders extending from the crankcase. Each cylinder includes an intake valve and an exhaust valve to actuate between open and closed positions regulating fuel flow through the cylinder, a spark plug configured to initiate combustion of the fuel in the cylinder, and a piston operatively positioned in the cylinder. The internal combustion engine also includes a crankshaft in the crankcase and driven by each piston of the one or more cylinders, and a camshaft in the crankcase driven by the crankshaft and coupled to actuate each intake valve and each exhaust valve of the one or more cylinders according to a rotational position of the crankshaft. The generator also includes an inductive pickup mounted to the crankcase adjacent the camshaft configured to sense a rotational position of the camshaft, and a battery-operated ignition system wired to power each spark plug of the one or more cylinders. The battery-operated ignition system may be wired to the inductive pickup to receive a signal on a sensed rotational position of the camshaft and programmed to operate each spark plug based on the signal received from the inductive pickup. An alternator preferably mounts operatively to the crankshaft to produce electricity for distribution from the generator.

According to yet another embodiment of the invention, a generator includes a spark-ignition engine operable on a source of combustible fuel. The spark-ignition engine includes a crankcase, one or more cylinders operatively coupled to the crankcase, one or more spark plugs each mounted to a respective cylinder to initiate combustion of the fuel in the respective cylinder, and one or more ignition coils each coupled to a respective spark plug to provide a voltage to the respective spark plug. The generator may also include a battery system electrically coupled to each ignition coil to provide power thereto, and one or more sensors mounted on or within the generator to obtain data on an operating characteristic of the generator. A digital ignition module may be wired to each ignition coil to control operation of each respective spark plug, the digital ignition module programmed to receive data on an operating characteristic of the generator from each of the one or more sensors and to interrupt spark ignition of the combustible fuel upon determining the received data indicates a predetermined characteristic of the generator. An alternator may be driven by the spark-ignition engine to produce electrical power.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A standby generator comprising:

an alternator to produce electricity for distribution to an electrical system;

an air-cooled internal combustion engine driving the alternator, the air-cooled internal combustion engine comprising:

one or more cylinders, one or more spark plugs each configured to initiate combustion in a corresponding cylinder, and one or more ignition coils each coupled to a respective spark plug of the one or more spark plugs to provide a voltage to the respective spark plug;

a battery system electrically coupled to the one or more ignition coils to provide power thereto;

a digital ignition module wiring the battery system to each of the one or more ignition coils to control operation of the one or more spark plugs; and a battery charger powered by the alternator to recharge the battery system.

2. The standby generator of claim 1 further comprising a load sensor coupled to the air-cooled internal combustion engine to measure an engine load thereon; and wherein the digital ignition module is programmed to:

receive a sensor input from the load sensor indicating the engine load on the air-cooled internal combustion engine; and control ignition timing of the one or more spark plugs based upon the sensor input received from the load sensor.

3. The standby generator of claim 2 wherein the load sensor measures the engine load by measuring an electrical load on the alternator.

4. The standby generator of claim 1 wherein the air-cooled internal combustion engine further comprises:

a crankcase comprising a crankshaft therein, a camshaft in direct communication with the crankshaft, and an inductive pickup mounted to the crankcase to obtain rotational data of the camshaft; and wherein the digital ignition module is programmed to:

receive the rotational data from the inductive pickup, determine a rotational position of the crankshaft using the rotational data, and control ignition timing of the one or more spark plugs based on the rotational position of the crankshaft.

5. The standby generator of claim 4 wherein the digital ignition module includes a filter and detector circuit to digitize the rotational data received from the inductive pickup.

6. The standby generator of claim 1 further comprising one or more safety sensors coupled to the air-cooled internal combustion engine each to measure an oil level, an oil pressure, or an engine speed; and wherein the digital ignition module is programmed to:

receive measurement data from the one or more safety sensors indicating the oil level, the oil pressure, or the engine speed;

compare the measurement data with a predetermined respective low oil level, low oil pressure, or overspeed condition to determine if the measurement data indicates a low oil level, a low oil pressure, or an overspeed condition; and when the measurement data indicates a low oil level, a low oil pressure, or an overspeed condition, interrupt operation of the one or more spark plugs.

7. The standby generator of claim 1 wherein the battery system is a 24-volt battery system and each of the one or more ignition coils operates on 24-volts.

8. The standby generator of claim 1 wherein the digital ignition module comprises:

a microcontroller to operate the one or more ignition coils; and one or more coil driver circuits each coupling the microcontroller to a respective ignition coil of the one or more ignition coils to amplify a control signal from the microcontroller to the respective ignition coil.

9. The standby generator of claim 8 wherein the digital ignition module further comprises a power supply circuit module wiring the battery system to each of the microcontroller and the one or more coil driver circuits, the power supply circuit module configured to reduce a voltage from the battery system to power the microcontroller and the one or more coil driver circuits.

10. The standby generator of claim 1 wherein the air-cooled internal combustion engine is a v-twin engine comprising two spark plugs and two ignition coils; and wherein the digital ignition module comprises a microcontroller controlling two coil driver circuits, each of the two coil driver circuits coupled to a respective one of the two ignition coils to control operation thereof.

11. The standby generator of claim 1 wherein the air-cooled internal combustion engine further comprising a fuel injection system coupled to each of the one or more cylinders to provide combustible fuel thereto, and wherein the digital ignition module is coupled to the fuel injection system to control supply of the combustible fuel to each of the one or more cylinders.

12. The standby generator of claim 11 wherein the digital ignition module is programmed to stop operation of the air-cooled internal combustion engine by initiating substantially simultaneous interruption of both fuel injection from the fuel injection system and spark ignition of the combustible fuel from each of the one or more spark plugs.

13. The standby generator of claim 11 wherein the fuel injection system comprises:

a fuel and air mixer or a carburetor; and a fuel solenoid coupled to control fuel flow through the fuel and air mixer or carburetor;

wherein the digital ignition module is coupled to control operation of the fuel solenoid to selectively control fuel flow to each of the one or more cylinders.

14. The standby generator of claim 1 wherein the air-cooled internal combustion engine further comprises:

a crankcase comprising a crankshaft extending therefrom; and an engine cooling fan driven by the crankshaft to drive cooling air over the air-cooled internal combustion engine.

15. The standby generator of claim 14 further comprising a multi-chamber standby generator enclosure comprising a partition wall separating the enclosure into a first chamber and a second chamber of the multi-chamber standby generator enclosure, with the alternator and battery system positioned in the first chamber and the air-cooled internal combustion engine positioned in the second chamber such that the alternator and battery system are not heated by expelled cooling air from the air-cooled internal combustion engine.

16. A generator comprising:

an internal combustion engine comprising:

a crankcase;

one or more cylinders extending from the crankcase, each cylinder comprising:

an intake valve and an exhaust valve to actuate between open and closed positions regulating fuel flow through the cylinder, a spark plug configured to initiate combustion of the fuel in the cylinder, and a piston operatively positioned in the cylinder;

a crankshaft in the crankcase and driven by each piston of the one or more cylinders; and a camshaft in the crankcase driven by the crankshaft and coupled to actuate each intake valve and each exhaust valve of the one or more cylinders according to a rotational position of the crankshaft;

an inductive pickup mounted to the crankcase adjacent the camshaft configured to sense a rotational position of the camshaft;

a battery-operated ignition system wired to power each spark plug of the one or more cylinders, the battery-operated ignition system wired to the inductive pickup to receive a signal on a sensed rotational position of the camshaft and programmed to operate each spark plug based on the signal received from the inductive pickup;

an alternator operatively mounted to the crankshaft to produce electricity for distribution from the generator; and a load sensor mounted on or within the generator to measure an engine load on the internal combustion engine; and wherein the battery-operated ignition system is programmed to:

receive load data from the load sensor comprising the measured engine load, and optimize ignition timing of each spark plug of the one or more cylinders based on the load data.

17. The generator of claim 16 wherein the alternator is operatively mounted to the crankshaft on an opposite side of the crankcase from the inductive pickup.

18. The generator of claim 16 wherein the battery-operated ignition system comprises a 24-volt battery-operated ignition system.

19. The generator of claim 16 wherein the battery-operated ignition system comprises:

one or more ignition coils each coupled to power a respective spark plug;

a programmable ignition module operably connected to the one or more ignition coils to control operation thereof; and a battery system wired to the programmable ignition module to provide power thereto.

20. The generator of claim 19 wherein the battery system comprises a 24-volt battery system and the programmable ignition module supplies 24-volts from the 24-volt battery system to operate each of the one or more ignition coils.

21. The generator of claim 19 wherein the internal combustion engine further comprises a fuel injection system controlled by the programmable ignition module to provide fuel to each cylinder.

22. The generator of claim 21 wherein the fuel injection system comprises:

a fuel and air mixer or a carburetor; and a fuel solenoid coupled to control fuel flow through the fuel and air mixer or carburetor;

wherein the programmable ignition module is coupled to control operation of the fuel solenoid to selectively control fuel flow to each cylinder.

23. The generator of claim 19 where the programmable ignition module comprises:

a separate coil driver circuit coupled to each of the one or more ignition coils to control operation thereof;

a filter and detector circuit wired to the inductive pickup to digitize a signal from the inductive pickup on the sensed rotational position of the camshaft; and a microcontroller programmed to:

receive the digitized signal from the filter and detector circuit, and control each coil driver circuit based on the digitized signal.

24. The generator of claim 16 wherein the load sensor measures the engine load by measuring an electrical load on the alternator.

25. A generator comprising:

a spark-ignition engine operable on a source of combustible fuel, the spark-ignition engine comprising:

a crankcase, one or more cylinders operatively coupled to the crankcase, one or more spark plugs each mounted to a respective cylinder to initiate combustion of the fuel in the respective cylinder, and one or more ignition coils each coupled to a respective spark plug to provide a voltage to the respective spark plug;

a battery system electrically coupled to each ignition coil to provide power thereto;

one or more sensors mounted on or within the generator to obtain data on an operating characteristic of the generator;

a digital ignition module wired to each ignition coil to control operation of each respective spark plug, the digital ignition module programmed to receive data on an operating characteristic of the generator from each of the one or more sensors and to interrupt spark ignition of the combustible fuel upon determining the received data indicates a predetermined characteristic of the generator; and an alternator driven by the spark-ignition engine to produce electrical power.

26. The generator of claim 25 wherein the spark-ignition engine further comprises a fuel injection system to provide the combustible fuel to each of the one or more cylinders; and wherein the digital ignition module is coupled to the fuel injection system to control supply of the combustible fuel to each of the one or more cylinders.

27. The generator of claim 26 wherein the digital ignition module is programmed to interrupt spark ignition of the combustible fuel by controlling the fuel injection system to interrupt supply of the combustible fuel to each of the one or more cylinders.

28. The generator of claim 25 wherein the digital ignition module is programmed to interrupt spark ignition of the combustible fuel by controlling operation of the one or more spark plugs.

29. The generator of claim 25 wherein the operating characteristic of the generator that at least one of the one or more sensors obtains data on comprises an oil level measurement, an oil pressure measurement, or a speed level measurement of the spark-ignition engine, and further wherein the predetermined characteristic of the generator comprises a low oil level, a low oil pressure, or an overspeed condition.

30. The generator of claim 25 wherein the one or more ignition coils operates on 24-volts from the battery system.

31. The generator of claim 25 further comprising a load sensor coupled to the spark-ignition engine to measure an engine load thereon; and wherein the digital ignition module is programmed to operate the one or more ignition coils based upon data received from the load sensor on a measured engine load.

* * * * *